June 9, 1953  H. W. HOSFORD, JR  2,641,633
WIRE TRACER
Filed March 2, 1949

INVENTOR.
HARRY W. HOSFORD JR.
BY
Oberlin & Limbach
ATTORNEYS.

Patented June 9, 1953

2,641,633

UNITED STATES PATENT OFFICE 2,641,633

WIRE TRACER

Harry W. Hosford, Jr., Shaker Heights, Ohio

Application March 2, 1949, Serial No. 79,172

1 Claim. (Cl. 175—183)

The present invention relates as indicated to an improved electric wire tracer. More specifically, the invention relates to a device to be used as a line tester for telephone lines and cables and related electric circuits.

It is not uncommon in telephone and related communication systems to encounter transmission lines or wires of considerable length which may be twisted together into one group, much like a cable, in order to facilitate handling. Whenever a defect occurs in such lines or cables, as for example a short circuit or open circuit, it is imperative that the difficulty be quickly found and repaired. Therefore, it is desirable in work of this sort to provide a device that will not only determine the cause of the difficulty existing in the system or circuit but will also quickly and accurately locate the exact spot where the trouble lies. Such a device must necessarily be portable, simple of operation, and be adaptable for use in locating particular wires or lines some distance removed from the point of connection.

Numerous devices of this sort have been produced in the past; however, they were either difficult of operation, uncertain in result, or many times too expensive for widespread use.

It is therefore a principal object of this invention to provide a line or circuit tester that is portable, simple and inexpensive of construction, yet foolproof and effective in operation.

It is a further object of this invention to provide a device that will quickly and accurately identify desired lines in electric circuits.

Another object is to provide a device to quickly locate open lines in electric circuits.

Still another object of this invention is to provide a device adapted to determine the continuity of an electric circuit, regardless of whether the lines to be tested are carrying an electric current.

Other objects will become apparent as the following description proceeds.

To the accomplishment of the foregoing and related ends, said invention then comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

Figure 1:
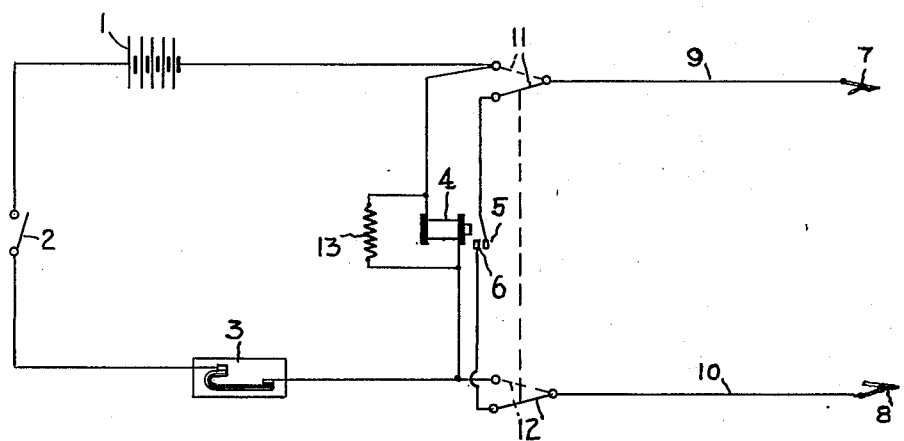
Figure 2:
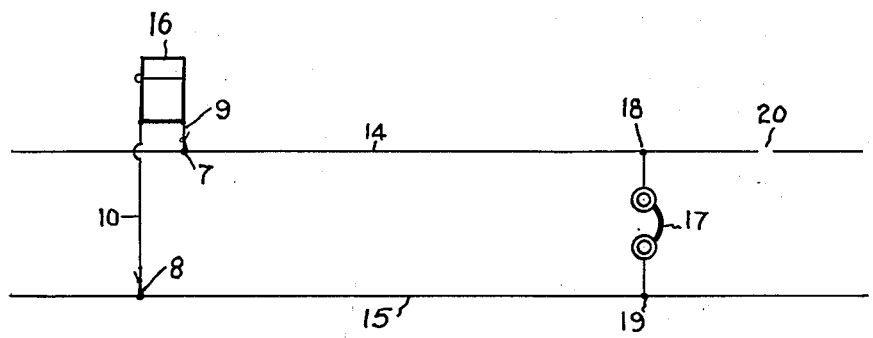

In said annexed drawing:

Fig. 1 is a schematic diagram of the circuit employed in my improved tester; and Fig. 2 is a diagrammatic illustration of such improved tester in operation.

One preferred embodiment of my invention includes an electric circuit tester adapted to be used with a receiver, for example, comprising a circuit including a source of electric current, an interrupter in series with such source of electric current, a relay in series with such source of electric current and such interrupter, shorting contacts operated by such relay and means to connect such shorting contacts into the circuit to be tested. The intermittent electric impulse consequently transmitted by such circuit to be tested may readily be detected by means of earphones, for example, at a considerable distance from the point of attachment of the signal originating unit.

Another preferred embodiment of this invention adapted to initiate a signal in either a current-carrying circuit or a circuit without current comprises an electric circuit tester adapted to be used with a set of headphones, comprising a circuit including a portable source of electric current such as a dry cell, an interrupter in the form of a "flasher" or the like in series with such source of electric current adapted to periodically interrupt the flow of electric current through such circuit, a relay in series with such source of electric current and such interrupter adapted to be operated intermittently by such interrupted current, a high resistance shunt connected across such relay, a pair of shorting contacts intermittently opened and closed by such relay, means for connecting such shorting contacts across the circuit to be tested, switch means selectively operable to electrically isolate such shorting contacts from the circuit to be tested and instead connect such circuit in series with the tester circuit including the interrupter, and a switch in series with such source of electric current and such interrupter adapted to turn the device on or off.

Referring now more particularly to the preferred form of construction of my invention shown in Fig. 1, an electric battery 1, such as a dry cell commonly used in flashlights, is connected in series with a simple single-pole, single-throw switch 2, a circuit interrupter 3 and a D. C. relay 4.

Switch 2 is the ordinary "on-off" type and any available type suitable for this purpose may be used. The circuit interrupter 3 may be any of the readily available means for periodically and regularly interrupting a flow of electic current. It was found that for the purposes of this invention a relatively slowly operating current interrupter was most effective rather than the common electric buzzer, for example. Thus, a slow acting bi-metallic "flasher" may desirably be used. A typical bi-metallic "flasher" operates on the principle that heat caused by current flowing through the unit will expand one side of a bi-metallic strip more than the other, thereby causing a warping or deflection which will make or break an electric contact. The thermal capacity of the components of the bi-metallic strip determines the time period between make and break, and it is thus possible to choose a particular flasher for the time factor desired.

Other known types of interrupters may be used in place of the preferred bi-metallic "flasher," as for example motor operated cams or a relay-operated ratchet, with generally equivalent results. However, to obtain the type of signal I desire in a portable unit the bi-metallic "flasher" interrupter is preferred. Relay 4 is of the widely used D. C. type and is well known to those skilled in the art.

The normally open relay contact points 5 and 6 are connected to circuit clips 7 and 8 through wires 9 and 10 respectively. Double-throw, single-pole switches 11 and 12 preferably adapted to be operated in unison serve to include contact points 5 and 7 in the circuit to be tested but such contact points will always be electrically isolated from the circuit of the tester. When switches 11 and 12 are in dotted line position (Fig. 1) then shorting contact points 5 and 6 are isolated both from the circuit proper of the tester and from the circuit to be tested and such latter circuit will be in series with the tester circuit. A high resistance shunt 13 is shown connected across relay 4 which serves to smooth out the action of the relay 4 and to increase the output level of the signal produced.

From the foregoing description it will be apparent that the device of my invention is adapted to be selectively operable in two different ways.

When lines 14 and 15 of the external circuit to be tested (Fig. 2) have an independent power supply, as in the usual telephone lines, for example, switches 11 and 12 will be thrown to solid line position. Clips 7 and 8 are then attached across lines 14 and 15 to connect the tester 16 thereto, but it will be noted that the circuit of the tester will be electrically isolated from the circuit to be tested so that there will be no danger of burning out the former. I have found this arrangement to be decidedly preferable to prior art devices relying on the inclusion of condensers to protect the tester circuit. Switch 2 is now closed and current will flow through the tester circuit, intermittently interrupted by operation of "flasher" 3. Such intermittent current consequently operates relay 4 to close open contacts 5 and 6, preferably about once a second. This making and breaking of contacts in the circuit being tested causes a sharp distinctive signal to be transmitted to a receiver such as earphones 17 connected across lines 14 and 15 at 18 and 19. It will be appreciated that but a single repairman or operator will ordinarily be required on the job since he may first connect the tester to the lines outside on a pole and then enter a building, for example, and identify the lines in question by means of the earphones.

The type of signal produced as above explained is much more distinctive and easily recognizable than that produced by inclusion of the common electric buzzer sometimes employed in the past.

If there is a break 20 in the circuit, this may be located by moving the phones along wires 14 and 15 until the signal is no longer received. To locate short circuits and to determine the continuity of a circuit, the device may be employed in substantially the same manner.

When lines 14 and 15, on the other hand, are not provided with an independent power supply, then switches 11 and 12 will be thrown to dotted line position, cutting out contacts 5 and 6 entirely and connecting the tester circuit and circuit to be tested in series. Now, upon closing switch 2 current from battery 1 will pass through the lines 14, 15, of the circuit to be tested, interrupted intermittently by action of flasher 3. A distinctive signal sufficiently powerful for most purposes is thus transmitted to receiver 17. The manner of employment is as explained above.

It will be seen from the foregoing that I have provided a simple but efficient wire tracer and line tester having several noteworthy advantages, including portability, simplicity of operation, and low cost. When the circuit under test is carrying a current, the desired intermittent signal is transmitted without endangering the circuit of the tester unit, but when no current is on the line to be tested the same device is nonetheless made usable merely by throwing a switch.

As shown in Fig. 2, the tester 16 will preferably be installed in a small box for easy transportation.

Other modes of applying the principle of the invention may be employed, change being made as regards the details described, provided the features stated in the following claim.

I therefore particularly point out and distinctly claim as my invention:

An electric circuit tester adapted to be used in conjunction with a receiver such as an earphone or the like, comprising a portable housing, a first electric circuit in said housing including in series a source of direct current, a manually closable normally open switch, and a current responsive thermostatic interrupter; a second electric circuit in said housing including a relay winding and a high resistance shunt connected across said winding; a third electric circuit in said housing including normally open switch contacts adapted to be actuated in response to energization of said winding; two manually operable selector switches likewise located in said housing each comprising a pair of contacts and a contact making element selectively movable into engagement therewith, said first and second electric circuits being connected in parallel to one pair of corresponding contacts of said switches and said third electric circuit being connected across the other pair of corresponding switch contacts; a test lead connected to each such switch element and extending from said housing; such test leads being provided with connector means at the respective free ends thereof for connection to the circuit to be tested; and means mechanically connecting such switch elements for simultaneous movement, whereby said selector switches in one position will connect such leads to said first and second electric circuits and in another position to said third electric circuit.

HARRY W. HOSFORD, Jr.

References Cited in the file of this patent

UNITED STATES PATENTS

| Number | Name | Date |
|---|---|---|
| 874,690 | Lincoln | Dec. 21, 1907 |
| 1,722,768 | Schnetzler | July 30, 1929 |
| 2,127,216 | Hallden et al. | Aug. 16, 1938 |
| 2,291,533 | Cummings | July 28, 1942 |
| 2,447,037 | Sitzer | Aug. 17, 1948 |